(12) United States Patent
Tran et al.

(10) Patent No.: US 12,177,071 B2
(45) Date of Patent: Dec. 24, 2024

(54) TECHNIQUES FOR HARDWARE CONFIGURATION REPORTING USING CHANGE MESSAGES

(71) Applicant: T-Mobile USA, Inc., Bellevue, WA (US)

(72) Inventors: Emile Minh Tran, Sammamish, WA (US); Muhammad Shakil, Snoqualmie, WA (US); Robert Berrier, Renton, WA (US); Joshua Van de Walle, Bellevue, WA (US); Benjamin Yuen, Puyallup, WA (US); Danny Goswami, Bothell, WA (US); Murali Krishnan Govindan, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/318,347

(22) Filed: May 16, 2023

(65) Prior Publication Data
US 2024/0388502 A1 Nov. 21, 2024

(51) Int. Cl.
*H04L 41/082* (2022.01)
(52) U.S. Cl.
CPC ................... *H04L 41/082* (2013.01)
(58) Field of Classification Search
CPC ..................................................... H04L 41/082
See application file for complete search history.

(56) References Cited

U.S. PATENT DOCUMENTS

| | | | |
|---|---|---|---|
| 10,123,223 B1* | 11/2018 | Ford | H04W 24/08 |
| 2002/0094782 A1* | 7/2002 | Lin | H04W 52/343 455/67.11 |
| 2007/0225028 A1* | 9/2007 | Nelson | H04W 24/04 455/524 |
| 2009/0264119 A1* | 10/2009 | De Pomian | H04W 24/08 455/424 |
| 2011/0212744 A1* | 9/2011 | Katayama | H04W 52/245 455/522 |
| 2013/0171733 A1* | 7/2013 | Haick | G01N 27/223 436/39 |
| 2013/0217382 A1* | 8/2013 | Kudo | H04W 24/04 455/423 |
| 2020/0275413 A1* | 8/2020 | Zhang | H04W 72/51 |
| 2022/0272503 A1* | 8/2022 | Chai | H04M 15/8214 |
| 2023/0186200 A1* | 6/2023 | Cella | G05B 19/41885 705/7.17 |

\* cited by examiner

*Primary Examiner* — Moustafa M Meky
*Assistant Examiner* — Kidest Mendaye
(74) *Attorney, Agent, or Firm* — Lee & Hayes, P.C.

(57) ABSTRACT

Techniques are described herein for providing hardware configuration updates relating to equipment nodes in a network using change messages. In embodiments, the techniques may comprise receiving a status update comprising status information for one or more equipment nodes, determining, based on the status information, one or more changes in status of the one or more equipment nodes since a prior status update, and generating a change message that includes the one or more changes. The techniques may further involve providing the change message to at least one second computing device, wherein the one or more changes is used to update aggregate data maintained by the second computing device.

19 Claims, 7 Drawing Sheets

TECHNIQUES FOR HARDWARE CONFIGURATION REPORTING USING CHANGE MESSAGES

BACKGROUND

Cellular networks are frequently used to enable communication between various mobile devices. In a cellular network (such as the Global System for Mobile communication (GSM) and TETRA (TErrestrial Trunked RAdio)), a geographical region is divided into a number of cells, each of which is served by a base station (also referred to as a Base Transceiver Station (BTS)). Such cellular networks are typically made up of a number of base stations that are geographically distributed throughout the geographical region in a way that maximizes wireless transmission coverage for the cellular network. In such cellular networks, a cluster of geographically-proximate base stations may be managed locally by a computing device running an Operations Support System (OSS). Such a computing device may manage the cluster of base stations based on communications with a network management device. However, in cellular networks with expansive coverage, such communication can require a large amount of bandwidth due to the large number of base stations/OSSs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

This disclosure describes techniques that may be performed to provide hardware configuration updates for a number of equipment nodes to a network management device in an optimal manner. The techniques may be performed between a number of network components, such as equipment nodes (e.g., base stations and other hardware components), a computing device operating an OSS that manage equipment nodes in a region, and a network management device.

In embodiments, status information is received at an OSS from an equipment node that represents a current state of hardware configurations for the equipment node. For example, the status information may include information about a current power transmission level, a transmission frequency (or band of frequencies), an antenna angle, a temperature, etc. for the respective equipment node. Upon receiving status information, the OSS may be caused to identify one or more status updates for the equipment node based on a comparison between the received status information and information maintained locally about the respective equipment node. The status updates are then included in a change message that is transmitted by the OSS to the network management device.

Embodiments of the disclosure provide for a number of advantages over conventional systems. For example, the implemented system may provide change messages to a network management device in real time (or substantially real time) as status information is received. This allows for maintaining more up-to-date hardware configuration data over conventional systems while minimizing bandwidth usage needed to relay hardware configuration data updates.

Figure 1:
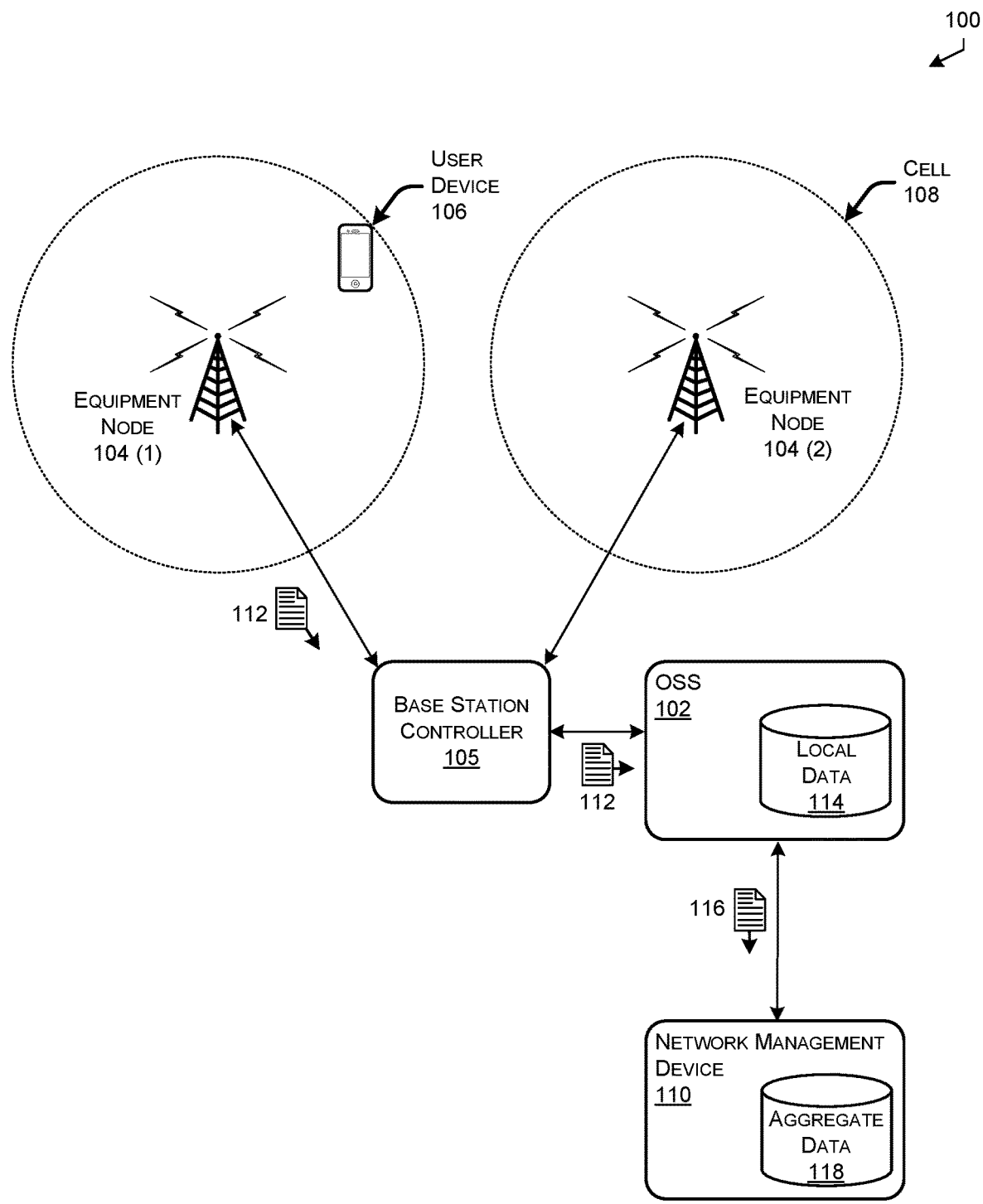
FIG. 1 depicts an example environment in which information associated with network equipment is collected and aggregated at a network management device in an optimal manner.

FIG. 1 depicts an example environment in which information associated with network equipment is collected and aggregated at a network management device in an optimal manner. In the system 100 depicted in FIG. 1, an Operations Support System (OSS) 102 may be in communication with a number of equipment nodes 104 (e.g., equipment nodes 104 (1-2)) via a base station controller (BSC) 105. In some embodiments, the equipment nodes 104 may include one or more radio access units that provide service (e.g., cellular data service) to a user device 106 within a cell 108 that defines a geographic area. The OSS 102 is in further communication with a network management device 110 configured to aggregate and manage information about a network (e.g., a cellular network).

An Operations Support System (OSS) 102 serves as a central point for administration, management, and provisioning of network elements located in a geographical region. An OSS 102 may be deployed to manage a number of equipment nodes 104 (e.g., base stations) within one of multiple geographic regions. Among other things, the OSS 102 administers the configurations/settings for the equipment nodes 104 in order to optimize network coverage in its respective geographic region. This may involve increasing or decreasing transmission power usage for various base stations, adjusting radio antenna (e.g., satellite) positions/angles, or any other suitable configuration adjustments.

In embodiments, the OSS 102 is configured to receive and/or manage a variety of status information (e.g., configuration parameters) 112 received from each of the equipment nodes 104. For example, the OSS 102 may receive information about a transmission power setting used by a radio access unit in communicating with various user devices. In another example, the OSS 102 may receive information about a radio frequency that a radio access unit in communicating with various user devices. The OSS 102 is configured to store configuration parameters received from the equipment nodes as local data 114. In some embodiments, information is relayed to the OSS 102 for a number of equipment nodes 104 (1-2) via a BSC 105. In these embodiments, the OSS 102 may provide desired configuration settings to the BSC 105, which may then implement those configuration settings on particular equipment nodes 104.

The OSS 102 may be further configured to transmit change messages 116 that include an indication of changes in information (e.g., configuration parameters) associated with the equipment nodes 104 stored as local data 114 to the network management device 110. The network management device 110 may store such information received from a number of OSS devices as aggregate data 118. Such aggregate data may be used to optimize operation of a network (e.g., a cellular data network).

An equipment node 104 may include any suitable type of electronic equipment configured to perform one or more functions in accordance with instructions received from an OSS 102. In some embodiments, an equipment node 104 may be a base station that includes one or more transmission mechanisms (e.g., a radio transceiver) capable of enabling wireless communication with a number of user devices. Such base stations may be distributed over an area in a sufficiently dense manner such that user devices (e.g., mobile communication devices) in communication with the network can communicate with each other or with a terrestrial network. In some embodiments, the equipment node 104 may include one or more sensors configured to collect information about the equipment node 104 itself or an environment in which the equipment node 104 is situated. Additionally, the equipment node 104 may include one or more mechanical means of adjusting/configuring components of the equipment node. For example, the equipment node may include a radio antenna as well as a motorized mechanism for adjusting a position of the radio antenna. In this example, each time that the position of the radio antenna is updated, information about the new position of the radio antenna is relayed by the equipment node 104 to the OSS 102.

A network system (e.g., a cellular network) in which the system 100 is implemented may provide network services to one or more user devices 106 via a base station (e.g., equipment node 104). The user device 106 may include any electronic device capable of interacting with a mobile network. In some non-limiting examples, the user device 106 may be a variety of devices including, for example: a mobile phone, a personal data assistant (PDA), or a mobile computer (e.g., a laptop, notebook, notepad, tablet, etc.) having mobile wireless data communication capability.

A BSC 105 may include any suitable computing device configured to perform the functions described herein. In embodiments, the BSC 105 manages the radio traffic between neighboring ones of a plurality of equipment nodes 104 (e.g., base stations). Such management of radio traffic may include controlling handoff between sectors and/or base stations as a user device traverses to different cells 108.

A network management device 110 may include any suitable computing device configured to manage operation of a network (e.g., a cellular network) as implemented herein. In some embodiments, the network management device 110 may include a Mobile Switching Center (MSC). Among other things, a MSC manages voice calls placed in and out of such a network. For example, the MSC may be configured to route calls to base stations for a particular cell 108 within which a user device 106 is located. As noted elsewhere, the network management device 110 may maintain aggregate data 118 that includes information about a current status of each of the equipment nodes 104 (1-2) in the network in which the system 100 is implemented.

The illustrative system 100 may be implemented within a mobile wireless network that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a user device 106 depicted in FIG. 1 carrying out wireless communications via a base station (also referred to as a base transceiver station or cell site). Such a mobile wireless network system may include hundreds or thousands of such stations.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
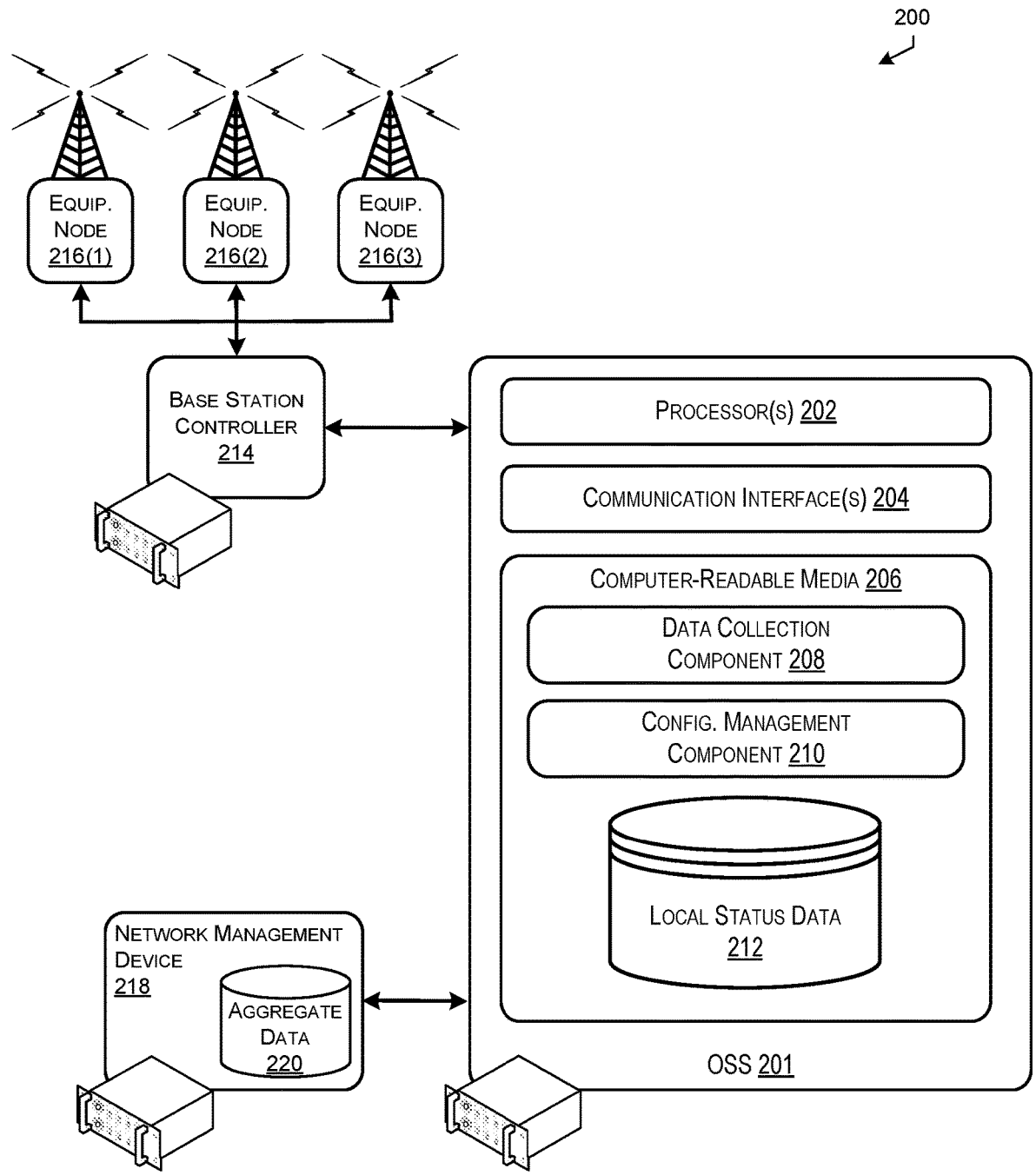
FIG. 2 depicts a component diagram of an example system to be implemented in a network in order to optimize hardware configuration reporting using change messages in accordance with at least some embodiments.

FIG. 2 depicts a component diagram of an example system to be implemented in a network in order to optimize hardware configuration reporting using change messages in accordance with at least some embodiments. As depicted in FIG. 2, an OSS 201 is in communication with a base station controller (BSC) 214 that manages a number of equipment nodes 216 (1-3). Additionally, the OSS 102 may be further in communication with a network management device 218.

The exemplary OSS 201 may be an example of the OSS 102 as described in relation to FIG. 1 above. It should be noted that the OSS (or any other described computing component) may include a single computing device (e.g., a server device) or a combination of computing devices. In some cases, the OSS may be implemented as a virtual system (e.g., via virtual machines implemented within a cloud computing environment).

As illustrated, the OSS 102 may include one or more hardware processors 202 configured to execute one or more stored instructions. Such processor(s) 202 may comprise one or more processing cores. Further, the OSS 102 may include one or more communication interfaces 204 configured to provide communications between the OSS 102 and other devices, such as the base station controller (BSC) 214, network management device 218, or any other suitable electronic device.

The OSS 102 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the OSS 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the OSS 102 to perform various operations described herein. For example, the computer-readable media 206 may include some combination of components configured to implement the described techniques. Particularly, the OSS 102 may include a component configured to perform data collection in relation to a number of equipment nodes of a network (e.g., data collection component 208) as well as a component configured to manage a configuration of each of a number of equipment nodes 216 (e.g., configuration management component 210). Additionally, the computer-readable media 206 may further maintain one or more databases, such as a database of status information for equipment nodes included within a region managed by the OSS (e.g., local status data 212).

A data collection component 208 may be configured to, when executed by the processor(s) 202, receive status information related to one or more equipment nodes 216 and update a status of the respective equipment node within local status data 212. In some embodiments, status information for an equipment node 216 may be relayed to the OSS 201 via a base station controller 214. Such status information may be obtained via one or more sensors installed upon (or in the vicinity of) the equipment node 216. Such status information may include any suitable data related to the equipment node. For example, status information may indicate a current power transmission level, a transmission frequency (or band of frequencies), an antenna angle, a temperature, etc. The received status information is then stored in relation to the respective equipment node 216.

In some embodiments, the data collection component 208 may further be configured to relay change messages to a network management device 218. Upon receiving the status information, the data collection component 208 may be configured to perform a lookup operation on the local status data 212 to retrieve previous status information for the respective equipment node 216. The data collection component 208 may then be configured to compare the received status information against the previous status information to identify one or more status changes as represented by differences between the data. The data collection component 208 is then configured to generate a change message that includes the status changes. The change message is then relayed to the network management device 218.

A configuration management component 210 may be configured to, when executed by the processor(s) 202, identify and execute changes to configuration settings of an equipment node 216. In embodiments, the network management device 218 may provide information on one or more objectives to be achieved by the network (e.g., extended range, change of frequency, etc.). In these embodiments, the configuration management component 210 may be configured to determine one or more configuration settings to be applied to one or more equipment nodes 216 in order to achieve the provided objective. In such embodiments, the configuration management component 210 may be configured to provide instructions to a base station controller 214 to cause it to update the configuration settings of the respective equipment node 216.

In some embodiments, the status information may be collected and provided to the base station in response to the base station controller 214 querying the equipment node 216. In some embodiments, the base station controller 214 may periodically receive a "heartbeat" signal from each equipment node 216 indicating an operational status of the respective equipment node. In these embodiments, information obtained from the heartbeat signal may be relayed by the base station controller 214 to the OSS 201 as status information. Alternatively, if the equipment node 216 fails to provide an expected heartbeat signal, status information may be provided to the OSS 201 indicating an inoperable status of the respective equipment node.

The OSS 201 may provide change messages to the network management device 218 in real time (or substantially real time) as status information is received. The network management device 218 may, as noted elsewhere, maintain a database of aggregate data 220 that includes status information for each of the equipment nodes 216 in the network. Upon receiving such a change message, the network management device may be configured to update one or more appropriate database entries to reflect information included within the change message.

Figure 3:
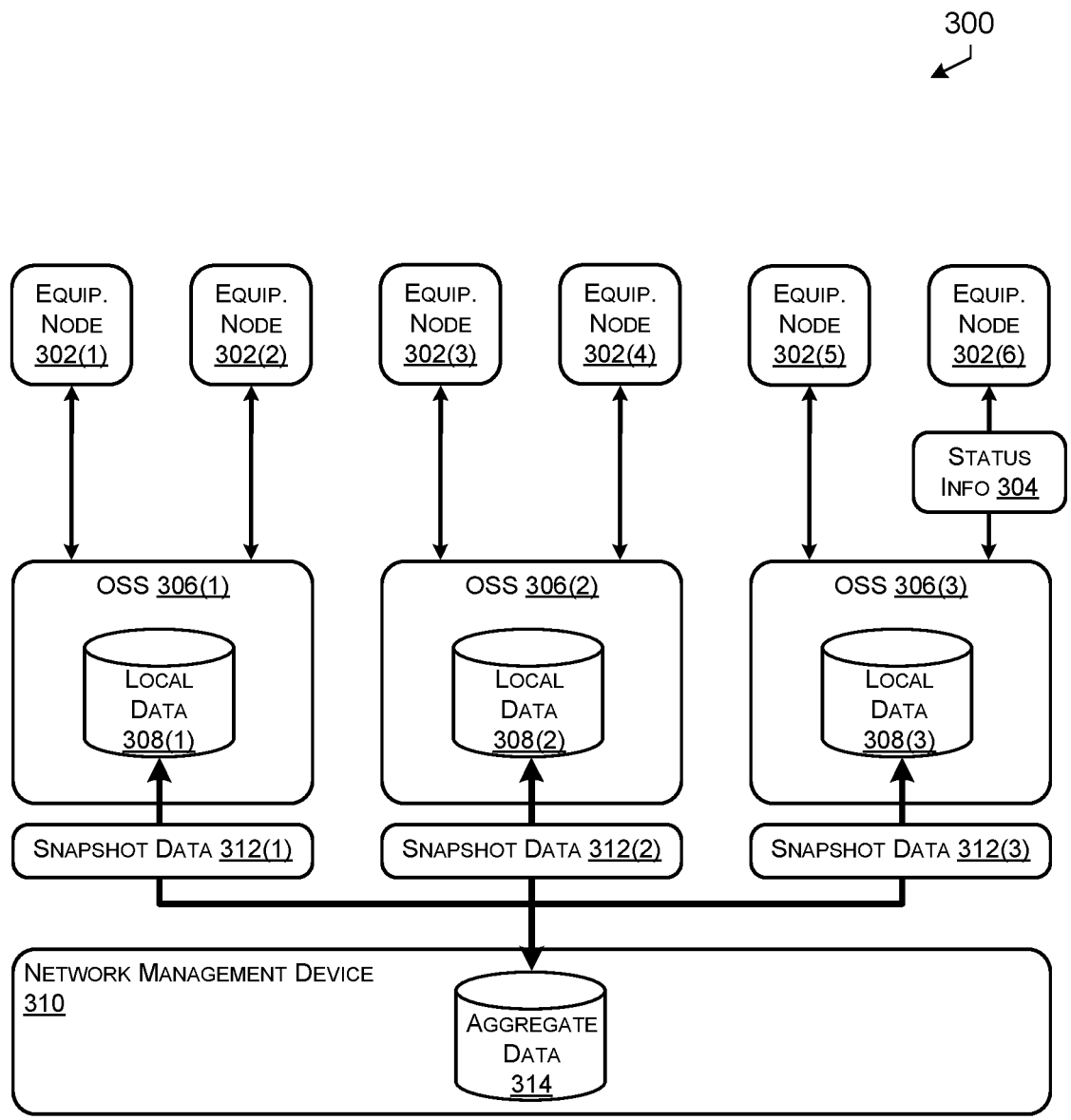
FIG. 3 depicts a block diagram illustrating a first process for providing hardware configuration updates to a network management device.

FIG. 3 depicts a block diagram illustrating a first process for providing hardware configuration updates to a network management device. In a conventional network system, a number of equipment nodes (e.g., base stations) 302 (1-6) are configured to relay status information 304 to a number of computing devices each running an OSS 306 (1-3). Upon receiving such status information, each OSS 306 may update information included stored as local data 308 (1-3) that relates to all of the equipment nodes 302 managed by the OSS 306.

As noted elsewhere, information included in each of the local data 308 (1-3) is provided to a network management device 310 where it is aggregated into a database of aggregate data 314 that includes status information for each of the equipment nodes 302 in the network.

In a conventional system, status information may be provided by each of the OSS 306 (1-3) via a multitude of snapshot data 312 (1-3). In such cases, all (or the majority) of the information included in local data 308 is transmitted to the network management device 310 on a periodic basis (e.g., daily, hourly, etc.). In some of these cases, each of the snapshot data 312 is received by the network management device 310 at the same time (or at substantially the same time). One skilled in the art would recognize that such a scenario might result in a significant use of bandwidth during times that snapshot data 312 is being transmitted to the network management device 310.

Figure 4:
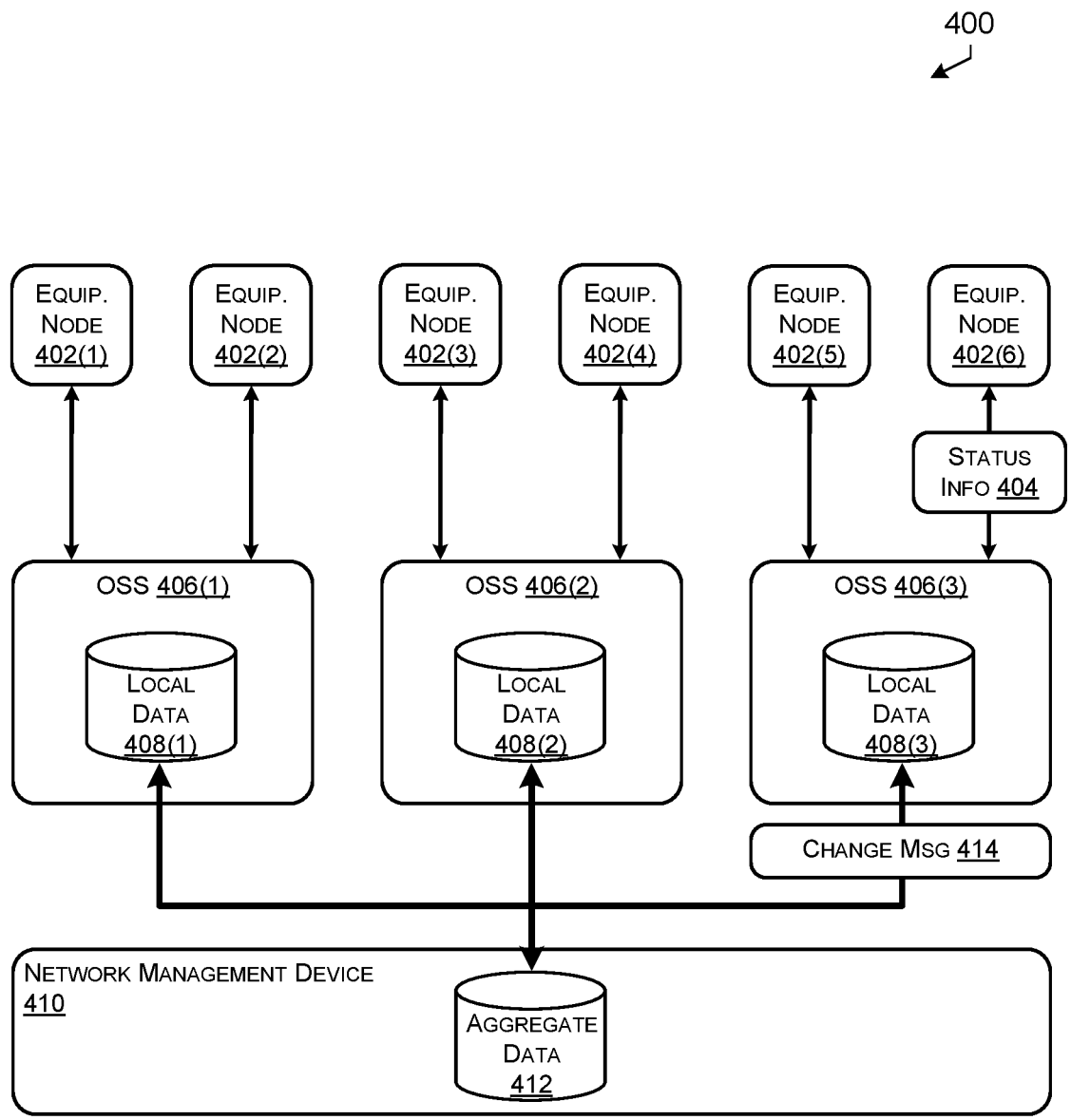
FIG. 4 depicts a block diagram illustrating a second process for providing hardware configuration updates to a network management device.

FIG. 4 depicts a block diagram illustrating a second process for providing hardware configuration updates to a network management device. As depicted, a number of equipment nodes (e.g., base stations) 402 (1-6) are configured to relay status information 404 to a number of computing devices each running an OSS 406 (1-3). Upon receiving such status information, each OSS 406 may update information included stored as local status data 408 (1-3) that relates to all of the equipment nodes 402 managed by the OSS 406.

As noted elsewhere, information included in each of the local data 408 (1-3) is provided to a network management device 410 where it is aggregated into a database of aggregate data 412 that includes status information for each of the equipment nodes 402 in the network.

In embodiments, upon receiving status information 404 from an equipment node 402, an OSS 406 may compare that status information 404 to information about the equipment node 402 that is stored in local data 408. Based on such a comparison, the OSS 406 may identify a number of status changes (e.g., status updates) for the respective equipment node 402. The OSS 406 may then generate a change message 414 that includes only the number of status changes. This change message 414 is then provided to the network management device 410, which subsequently records information related to the number of status changes within the aggregate data 412.

Figure 5:
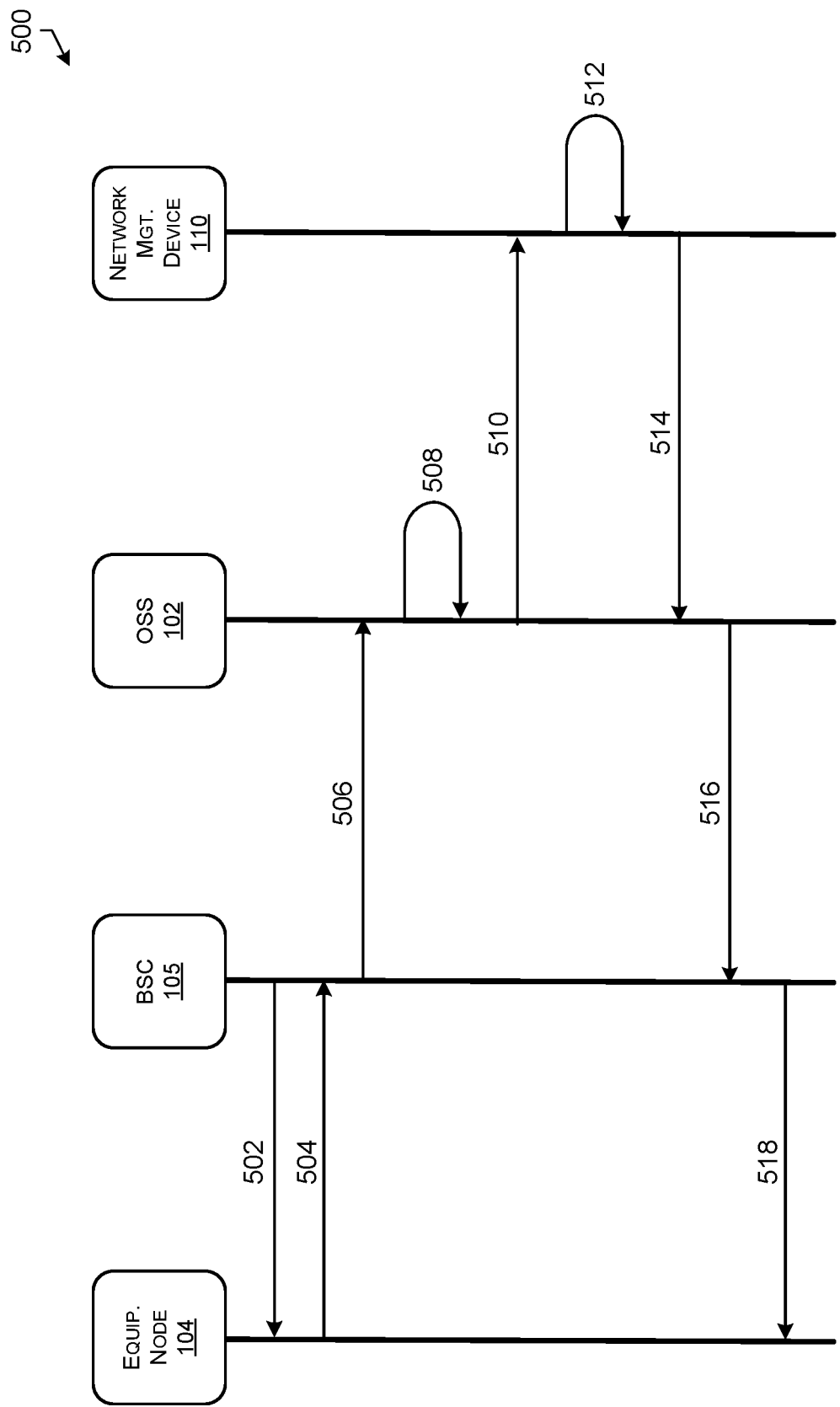
FIG. 5 depicts a swim lane diagram illustrating a process for providing hardware configuration updates to a network management device using change messages in accordance with at least some embodiments.

FIG. 5 depicts a swim lane diagram illustrating a process for providing hardware configuration updates to a network management device using change messages in accordance with at least some embodiments. The process 500 is performed by a number of components implemented within a network. More particularly, the process 500 may involve an equipment node 104, a Base Station Controller (BSC) 105, an Operations Support System (OSS) 102, and a network management device 110. Note that these may be examples of the respective equipment node 104, BSC 105, OSS 102, and network management device 110 as described in relation to FIG. 1 above.

At 502, the process 500 may optionally involve a BSC 105 transmitting a query to one of a number of equipment nodes 104. In some cases, a BSC 105 may periodically transmit queries to one or more equipment nodes to obtain status information from those equipment nodes. However, it should be noted that in other embodiments, the step 502 may not be performed.

At 504 of the process 500, an equipment node 104 may provide status information to a BSC 105. In some embodiments, this may involve obtaining sensor data from one or more sensors installed within, or in the vicinity of, the equipment node 104. For example, the equipment node 104 may include a temperature sensor (e.g., a thermometer) that is configured to obtain a current temperature of a component of the equipment node 104 and/or an environment in which the equipment node 104 is located. In another example, a gyroscopic sensor attached to a radio antenna may report a current position (e.g., angle and/or facing) of the radio antenna.

Upon collecting status information from one or more sensors, the equipment node 104 may be configured to transmit that status information to the BSC 105. In some cases, the equipment node 104 may collect and report status information to a BSC 105 on a periodic basis (e.g., daily, hourly, etc.). In other cases, the equipment node 104 may collect and report status information in response to a query received by the BSC 105 (e.g., the query described at 502). At 506 of the process 500, the BSC 105 may relay the received status information to an OSS 102.

At 508 of the process 500, the OSS 102, upon receiving the status information related to an equipment node, may identify the equipment node (e.g., based on an identifier, such as a serial number, included with the status information). Once the equipment node has been identified, the OSS 102 may retrieve current information stored in relation to that equipment node within a locally stored database. The current information may then be compared to the received information in order to identify one or more changes in the status of the equipment node based on differences determined between the two data. Upon identifying one or more changes in the status of the equipment node, the OSS 102 may generate a change message that includes an indication of the one or more changes. In some cases, the indication of the one or more changes includes current data values for one or more data fields. At 510 of the process 500, the change message may be transmitted by the OSS 102 to the network management device 110.

As noted elsewhere, a network management device 110 may maintain a database of aggregated information about a number of equipment nodes in a network. At 512 of the process 500, upon receiving the change message, the network management device 110 may update information stored in relation to the equipment node based on the information included within the change message. In some cases, this may involve overwriting a current data value stored in relation to the equipment node with a new data value indicated in the change message. In some cases, the change message may include information about a single status change for the equipment node (e.g., the change message may relate to a single data field). In other cases, the change message may relate to multiple status changes for the equipment node that are to be recorded by the network management device 110.

In some embodiments, the network management device 110 may determine, based on the maintained aggregate data, that one or more configuration settings for a particular equipment node are to be changed. In such embodiments, the network management device 110 may provide instructions to make the determined change to the OSS 102 at 514. Upon receiving those instructions, the OSS 102 may identify and relay the instructions to the appropriate BSC 105 at 516. Upon receiving the instructions, the BSC 105 may generate a command to cause the equipment node to adjust or update one or more settings based on the received instructions and may transmit that command to the equipment node 104 at 518.

Figure 6:
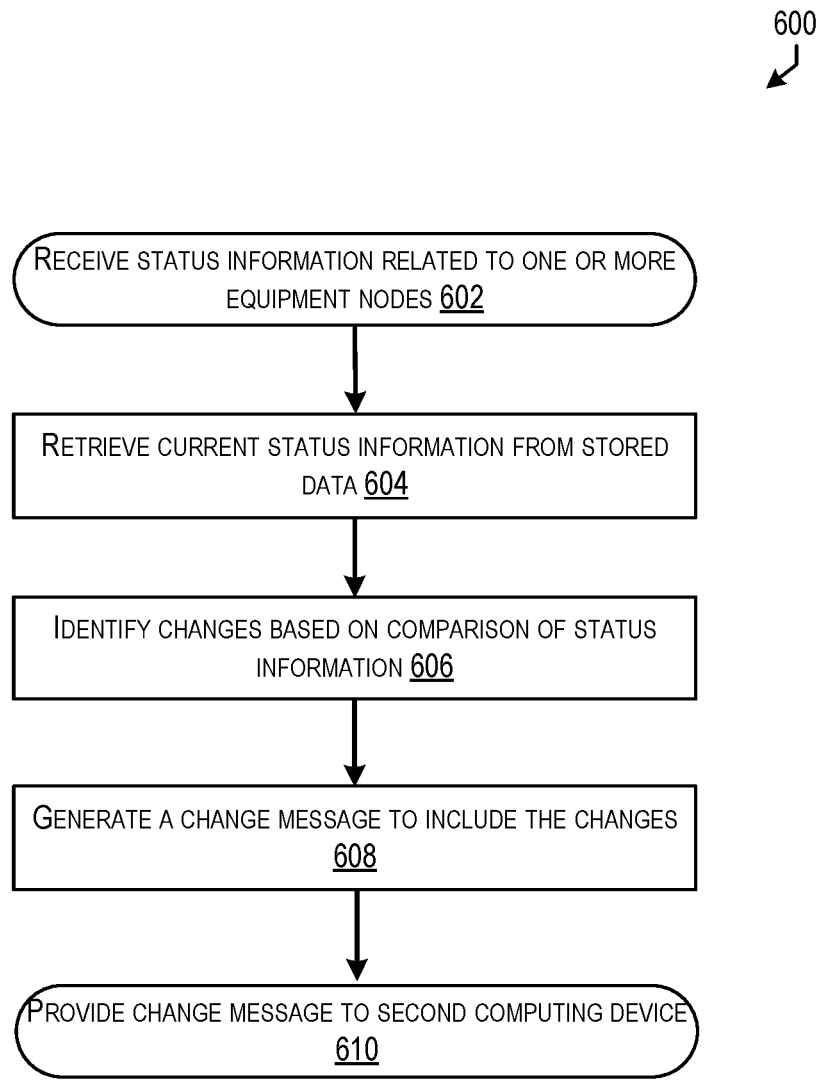
FIG. 6 depicts a flow diagram illustrating an exemplary process for providing hardware configuration updates using change messages in accordance with at least some embodiments.

FIG. 6 depicts a flow diagram illustrating an exemplary process for providing hardware configuration updates using change messages in accordance with at least some embodiments. The process 600 may be performed by an Operations Support System (OSS), such as the OSS 102 as described in relation to FIG. 1 above.

At 602, the process 600 may involve receiving, at an OSS, a status update comprising status information for one or more equipment nodes. In some embodiments, the status update is received directly from an equipment node. In other embodiments, the status update is received from a base station controller in communication with the one or more equipment nodes. In some embodiments, the status update is received in response to a request for a status update that is provided to the equipment node. In some embodiments, the status update is received on a periodic basis (e.g., daily, hourly, etc.).

The status information may be generated by one or more sensors installed within the one or more equipment nodes. The status information may represent an indication of a current state of at least one hardware component included within the equipment node. By way of example, the status information may include at least one of a current power transmission level, a transmission frequency, an antenna angle, or a temperature.

At 604, the process 600 may involve retrieving current status information for the equipment node from local data maintained by the first computing device. In some embodiments, the local data maintained by the first computing device may include status information related to multiple equipment nodes located within a geographic region associated with the first computing device.

At 606, the process 600 may involve determining one or more changes in status of the one or more equipment nodes since a prior status update. In some embodiments, determining the one or more changes in status of the one or more equipment nodes since a prior status update comprises comparing the status information to the current status information retrieved at 604.

At 608, the process 600 may involve generating a change message that includes the one or more changes. It should be noted that the change message does not include information about the one or more equipment nodes other than the one or more changes. At 610, the process 600 may involve providing the change message to at least one second computing device.

In embodiments, the one or more changes is used to update aggregate data maintained by the second computing device in relation to the equipment node. In embodiments, the aggregate data maintained by the second computing device comprises status information related to a set of equipment nodes operating on a network.

Figure 7:
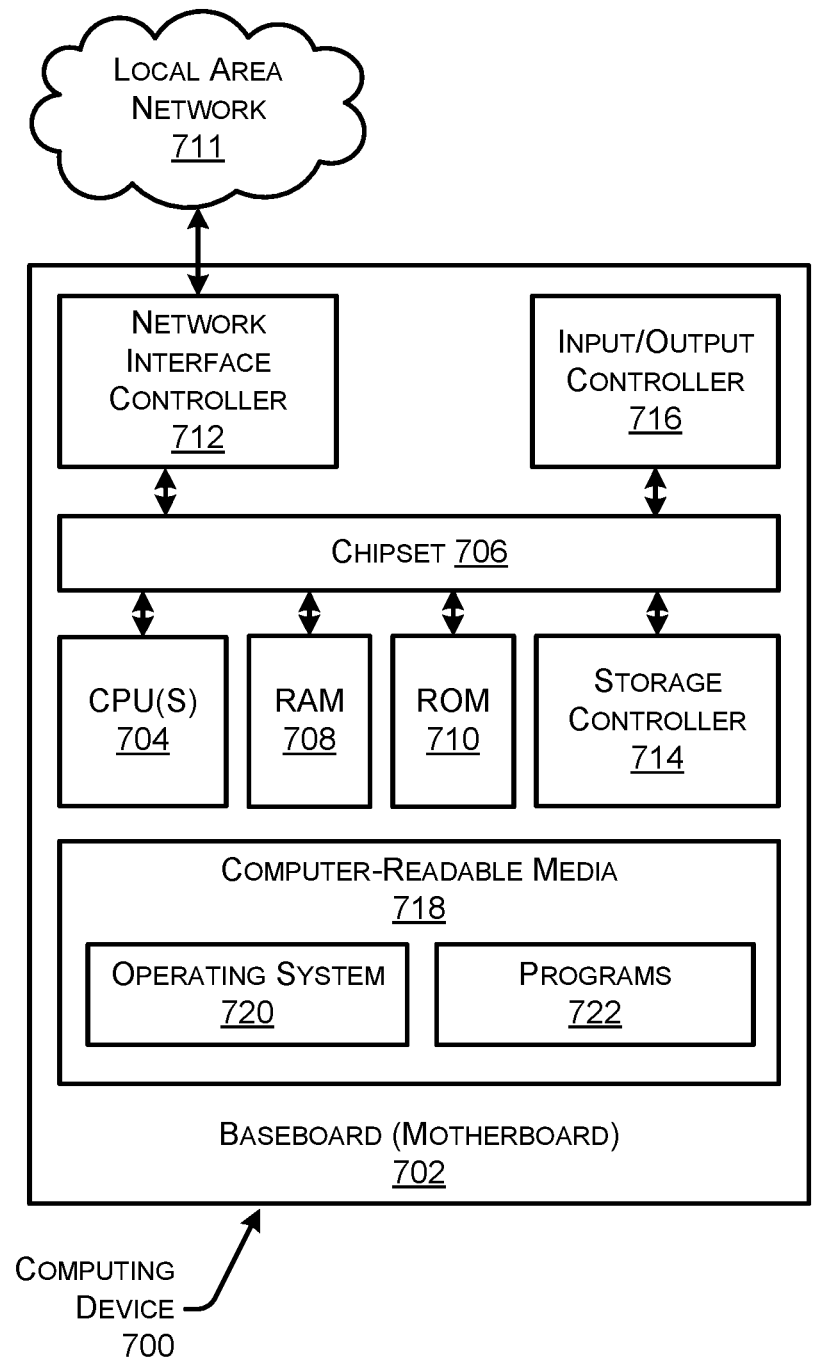
FIG. 7 shows an example computer architecture for a computing device capable of executing program components for implementing the functionality described above.

FIG. 7 shows an example computer architecture for a computing device 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 700 may, in some examples, correspond to a physical server as described herein, and may comprise networked devices such as servers, switches, routers, hubs, bridges, gateways, modems, repeaters, access points, etc.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network 711. The chipset 706 can include functionality for providing network connectivity through a NIC 712, such as a gigabit Ethernet adapter. The NIC 712 is capable of connecting the computing device 700 to other computing devices over the network 711. It should be appreciated that multiple NICs 712 can be present in the computing device 700, connecting the computer to other types of networks and remote computer systems.

The computing device 700 can be connected to a storage device 718 that provides non-volatile storage for the computer. The storage device 718 can store an operating system 720, programs 722, and data, which have been described in greater detail herein. The storage device 718 can be connected to the computing device 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by devices as described herein may be supported by one or more devices similar to computing device 700. Stated otherwise, some or all of the operations performed by an edge device, and/or any components included therein, may be performed by one or more computer device 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS®: SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs 704 transition between states, as described above. According to one embodiment, the computing device 700 has access to computer-readable storage media storing computer-executable instructions which, when executed by the computing device 700, perform the various processes described above with regard to the other figures. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

As described herein, the computing device 700 may include one or more hardware processors 704 (processors) configured to execute one or more stored instructions. The processor(s) 704 may comprise one or more cores. Further, the computing device 700 may include one or more network interfaces configured to provide communications between the computing device 700 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 711. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 722 may comprise any type of programs or processes to perform the techniques described in this disclosure. The programs 722 may comprise any type of program that cause the computing device 700 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause computing device 1002 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
periodically receiving, at a first computing device, a status update, each status update comprising status information for one or more equipment nodes of a wireless communication network, the one or more equipment nodes including at least one of a base station or hardware associated with the base station;
for at least a subset of the status updates,
determining, by the first computing device based on the status information, one or more changes in status of the one or more equipment nodes since a first prior status update;
generating, by the first computing device, a change message that includes the one or more changes, wherein the change message does not include information about the one or more equipment nodes other than the one or more changes; and
providing, by the first computing device, the change message to at least one second computing device; and
for at least one other of the status updates not belonging to the subset,
determining, by the first computing device based on the status information, that there are no changes in status of the one or more equipment nodes since a second prior status update;
generating, by the first computing device, a heartbeat message that does not include information about the one or more equipment nodes other than an indication that nothing has changed since the second prior status update; and
providing, by the first computing device, the heartbeat message to the at least one second computing device,
wherein the one or more changes are used to update aggregate data maintained by the second computing device, and
wherein the first computing device and the second computing device are associated with the wireless communication network.

2. The method of claim 1, wherein the status information of at least one of the status updates is generated by one or more sensors installed within the one or more equipment nodes.

3. The method of claim 1, wherein determining the one or more changes in status of the one or more equipment nodes since the first prior status update comprises comparing the status information to current status information stored in relation to the one or more equipment nodes stored in local data maintained by the first computing device.

4. The method of claim 3, wherein the local data maintained by the first computing device comprises status information related to multiple equipment nodes located within a geographic region associated with the first computing device.

5. The method of claim 1, wherein the aggregate data maintained by the second computing device comprises status information related to multiple sets of equipment nodes operating on the wireless communications network, each set of the multiple sets being associated with a different geographic region.

6. The method of claim 1, wherein the status information of at least one of the status updates comprises at least one of a current power transmission level, a transmission frequency, an antenna angle, or a temperature.

7. The method of claim 1, wherein at least one of the status updates is received from a base station controller in communication with the one or more equipment nodes.

8. The method of claim 1, wherein the first computing device is an operations support system associated with the wireless communication network.

9. A computing device comprising:
one or more processors; and
one or more non-transitory computer-readable media storing computer-executable instructions that, when executed by the one or more processors, cause the computing device to perform operations comprising:
periodically receiving a status update, each status update comprising status information for one or more equipment nodes of a wireless communication network, the one or more equipment nodes including at least one of a base station or hardware associated with the base station;
for at least a subset of the status updates,
determining, based on the status information, one or more changes in status of the one or more equipment nodes since a first prior status update;
generating a change message that includes the one or more changes, wherein the change message does not include information about the one or more equipment nodes other than the one or more changes; and
providing the change message to at least one second computing device; and
for at least one other of the status updates not belonging to the subset,
determining, by the first computing device based on the status information, that there are no changes in status of the one or more equipment nodes since a second prior status update;
generating, by the first computing device, a heartbeat message that does not include information about the one or more equipment nodes other than an indication that nothing has changed since the second prior status update; and
providing, by the first computing device, the heartbeat message to the at least one second computing device,
wherein the one or more changes are used to update aggregate data maintained by the second computing device, and
wherein the computing device and the second computing device are associated with the wireless communication network.

10. The computing device of claim 9, wherein the status information of at least one of the status updates comprises an indication of a current state of at least one hardware component included within the equipment node.

11. The computing device of claim 10, wherein the status information of at least one of the status updates comprises at least one of a current power transmission level, a transmission frequency, an antenna angle, or a temperature.

12. The computing device of claim 9, wherein determining the one or more changes in status of the one or more equipment nodes since the first prior status update comprises comparing the status information to current status information stored in relation to the one or more equipment nodes stored in local data maintained by the computing device.

13. The computing device of claim 12, wherein the local data maintained by the computing device comprises status information related to multiple equipment nodes located within a geographic region associated with the computing device.

14. The computing device of claim 9, wherein at least one of the status updates is received from a base station controller in communication with the equipment node.

15. The computing device of claim 14, wherein the at least one of the status updates is received in response to a request sent to the equipment node by the base station controller.

16. One or more non-transitory computer-readable media storing computer-executable instructions that, when executed by one or more processors of a first computing device, cause the one or more processors to perform operations comprising:
periodically receiving a status update, each status update comprising status information for one or more equipment nodes of a wireless communication network, the one or more equipment nodes including at least one of a base station or hardware associated with the base station;
for at least a subset of the status updates,
determining, based on the status information, one or more changes in status of the one or more equipment nodes since a first prior status update;
generating a change message that includes the one or more changes, wherein the change message does not include information about the one or more equipment nodes other than the one or more changes; and
providing the change message to at least one second computing device; and
for at least one other of the status updates not belonging to the subset,
determining, by the first computing device based on the status information, that there are no changes in status of the one or more equipment nodes since a second prior status update;
generating, by the first computing device, a heartbeat message that does not include information about the one or more equipment nodes other than an indication that nothing has changed since the second prior status update; and
providing, by the first computing device, the heartbeat message to the at least one second computing device,
wherein the one or more changes are used to update aggregate data maintained by the second computing device, and
wherein the first computing device and the second computing device are associated with the wireless communication network.

17. The one or more non-transitory computer-readable media of claim 16, wherein the status information of at least one of the status updates is generated by one or more sensors installed within the one or more equipment nodes.

18. The one or more non-transitory computer-readable media of claim 16, wherein the operations further comprise retrieving current status information for the one or more equipment nodes, wherein determining the one or more changes in status is based on a difference between the status information and the current status information.

19. The one or more non-transitory computer-readable media of claim 16, wherein the first computing device generates fewer change messages than a number of status updates it receives.

* * * * *